ANTHONY E. SIEGMAN
INVENTOR.

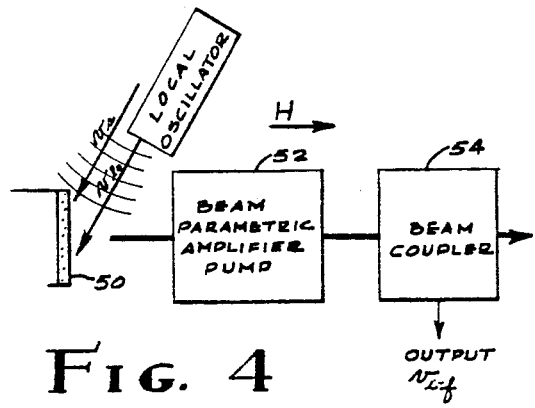
FIG. 4
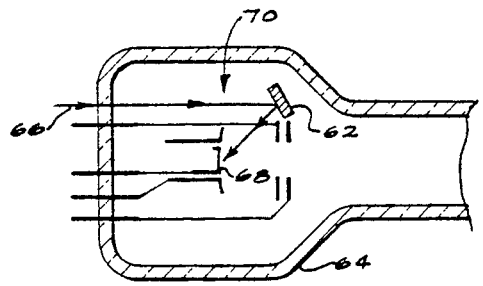
FIG. 6
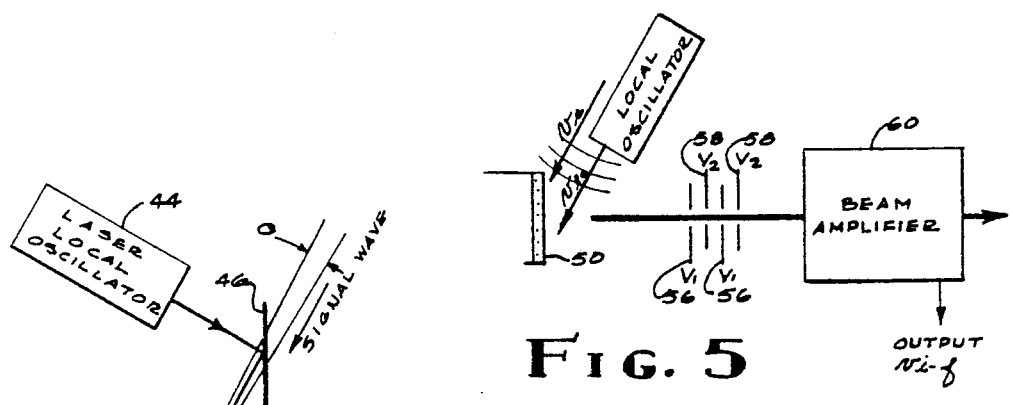
FIG. 5
FIG. 3
ANTHONY E. SIEGMAN
INVENTOR.
BY
ATTORNEYS

United States Patent Office 3,231,741
Patented Jan. 25, 1966

3,231,741
LIGHT SIGNAL RECEIVER SYSTEMS EMPLOYING HETERODYNE CONVERSION AND MICROWAVE AMPLIFICATION
Anthony E. Siegman, 454 Tennessee Lane, Palo Alto, Calif.
Filed Sept. 13, 1962, Ser. No. 223,491
15 Claims. (Cl. 250—199)

This invention relates generally to the field of the utilization of electromagnetic radiation at optical frequencies and more particularly to the detection and demodulation of coherent light signals.

With the invention and rapid development of lasers, or optical masers, in recent years, there has been provided for the first time a useful source of coherent, monochromatic radiation in the infrared, visible and ultraviolet or light region of the electromagnetic wave spectrum. Throughout the specification the term "light" or "optical" is used interchangeably as designating generally the aforementioned regions of the electromagnetic spectrum. Much effort had been expended, in the fields particularly of physics and electronics, in attempts to generate or amplify coherent light waves. It was known that such an achievement would make available a vast region of the spectrum for a multitude of purposes including, as examples, communications generally and metrology (measurements) applications. Such coherent light is monochromatic and is characterized by component waves propagating in phase with each other as distinguished from such components of so-called "white" noise. Thusly as at radio or microwave frequencies a great deal of energy could be concentrated at or extremely near to a single frequency and be utilizable by methods analogous to those at radio or microwave frequencies.

Known methods, including microwave maser techniques, could not be usefully extended into the optical frequency range because those methods required components such as wave cavities with physical dimensions of the order of a wavelength of the radiation being utilized. Obviously such components can neither be manufactured nor meaningfully utilized at optical frequencies where the wavelengths of interest are vanishingly small; and when it is attempted to use cavities, for example, which have dimensions corresponding to a large number of wavelengths, many modes are supported, coherence is degraded, and impracticably large sources of pumping power are required.

When operative lasers were developed, a major step was made toward the extremely advantageous utilization of the vast optical spectrum; however many desired applications of the use of the coherent optical radiation require that it be modulated as for example by pulses for radar-like applications, or amplitude or angular modulation for communications applications. It is elementary that the higher the modulation frequencies, the greater the total amount of information that can be carried by the "carrier" wave. Accordingly, it is highly desirable to modulate the light beam with extremely high radio frequencies such as those in the microwave range.

A number of modulation techniques have been proposed and demonstrated. For example a liquid Kerr cell and the solid state Pockels cell have been shown to be useful in this connection. Of these the Pockels cell is of particular importance in that modulation is possible to at least the order of 25 kilomegacycles and to modulation powers of the order of a kilowatt for 100% amplitude modulation with x-band modulation. The basic effect employed in the Pockels cell is an electrically induced birefringence in a crystal such as potassium dehydrogen phosphate. This technique produces directly an angular modulation of the light by virtue of its polarization orientation with respect to two orthogonal axes in the crystal; and by combining appropriate polarizers and quarter wave plates this phase (or frequency) modulation can be converted to amplitude modulation.

The present invention, as indicated above, is concerned primarily with demodulation of the light beam which has been modulated at but not necessarily limited to microwave frequencies by any desired technique, and most of the following examples and discussion will be directed thereto without particular regard to how or where the light beam was generated or modulated.

Prior art attempts to provide the demodulation or detection of intelligence carrying coherent light waves have typically been directed toward the development of solid state semiconductor photodiodes using either a PIN structure or a varactor diode structure with high back bias. The transit time across the intrinsic region or depletion layer in such devices can be very short permitting photo detection of modulation frequencies into the lower microwave region.

Although such photodiodes may be made to be simple, rugged, and dependable, and may exhibit relatively high quantum efficiencies and sensitivities, even in the infrared region, their design, for use in such demodulation applications, requires a serious compromise between obtaining small junction capacitance, large sensitive area, and low transit time. Moreover their maximum bandwidths are small and they have no built-in amplification; that is, no capability for amplifying the detected signal.

Another type of prior art light detector is the conventional photomultiplier tube which does contain a capability for built-in amplification; and its amplification and sensitivity may be relatively high. However, reduction of the electron transit time spread to permit operation of the electron multiplier for detecting and amplifying modulation in the microwave range is a severe problem not yet satisfactorily solved; similarly an output coupling technique for photomultipliers which is satisfactory at microwave frequencies has not yet been developed.

Further disadvantages of the photomultipliers are that they typically require relatively elaborate and bulky power supplies and that the higher gain types are susceptible to burn out under slight overload conditions. In this latter connection it should be noted that the amplifier mechanism amplifies both the direct and the fluctuating currents in the tube; and that therefore, when used in the heterodyne mode as discussed below, the strong "local oscillator" laser creates a direct current component in a photomultiplier which tends particularly quickly to cause burn-out of the sensitive electron multiplier.

Other light demodulation methods are known or have been proposed but they also suffer from limitations and compromises such as those pointed out above.

It is therefore an object of the present invention to provide a light signal demodulator which is not subject to these and other disadvantages of the prior art.

It is another object to provide a photo-demodulator which is capable of detecting microwave signal modulation on a light beam carrier wave.

It is another object to provide a microwave phototube having a very wide bandwidth.

It is another object to provide an optical super-heterodyne receiver tube having intrinsic mixing and intermediate frequency (I.-F.) amplification.

It is another object to provide an integral optical wave detector and microwave amplifier tube.

Briefly, in accordance with the structural features of the invention, these and other objects are achieved in phototube detector and amplifier systems which may be utilized in two general modes of operation. The first will be referred to as the "video" mode in which light which has been modulated at a microwave frequency is directly demodulated. This mode will be seen to be analogous to the direct detection of video signals with a radio crystal detector. In the second mode, which will be referred to as the "heterodyne" mode, two coherent light signals are mixed or heterodyned to produce a "difference" or "beat" frequency or, synonymously, "intermediate" frequency (I.-F.). This mode will be understood as being completely analogous to the mixing of two radio signals in a mixer crystal of a heterodyne receiver.

Hence, because of these analogies, the terms "video mode" and "heterodyne mode" will be used in this specification to indicate respectively a mode of operation of the invention in which a modulated light beam is directly demodulated and a mode in which the light beams are mixed and their beat frequency signal is demodulated.

One example of an embodiment of the invention is a microwave traveling wave amplifier tube which includes an electron gun having a photosensitive cathode. Optical structures are provided for directing, in the video mode of utilization, a microwave modulated beam of light onto the photo surface. The resultant emitted electron photo current is modulated in direct relationship to the amplitude modulation of the light beam. The modulated electron stream is then directed through a traveling wave tube microwave interaction structure such as a helix wherein amplification of the stream modulation signal is accomplished by way of electromagnetic interaction between the signal stream and waves launched on the helix. The amplified signal is then coupled to an output device or a microwave receiver for further amplification.

Alternatively, in the heterodyne mode the input light signal may be mixed with another light signal such as from a local oscillator laser. The mixing may be achieved by directing both the light beams onto the photosensitive cathode. Because it is a square law device such a cathode mixes or heterodynes the two optical signals to provide a resultant I.-F. beat frequency signal which typically may be made, by choice of the optical frequencies, to lie in the microwave range of the spectrum. The I.-F. signal of course contains the modulation on the input light signal and its intelligence is in the emitted photo-current in the form of a density modulated electron stream. The traveling wave tube microwave interaction mechanism then readily amplifies the I.-F. signal with very high gain and provides the useable output signal containing the intelligence of the original modulation.

With reference again to the crystal analogy, it may be seen that the photo cathode is structurally analogous to the crystal element in that both can detect directly or operate as a heterodyne mixer.

Further details and examples of these and other novel features of the invention and their principles of operation, as well as additional objects and advantages, will become apparent and be best understood from a consideration of the following description taken in connection with the accompanying drawings which are all presented by way of illustrative example only and in which:

FIG. 3 is a diagram illustrating an example of the geometric optics utilized in the combination of the present invention;

FIG. 4 is a diagram illustrating an example of the present invention including a parametric amplifier;

FIG. 5 illustrates an example of the invention which includes in combination a velocity-jump pre-amplifier; and FIG. 6 is a schematic view of an alternative example of the geometric optics of the invention.

Referring to the particular figures, it is stressed that the details shown therein are by way of example only and are presented in the cause of providing what is believed to be the most useful and readily understood description of the principles of the invention. The detailed showing is not to be taken as a limitation upon the scope of the invention which is to be defined by the appended claims forming a part of this specification.

Figure 1:
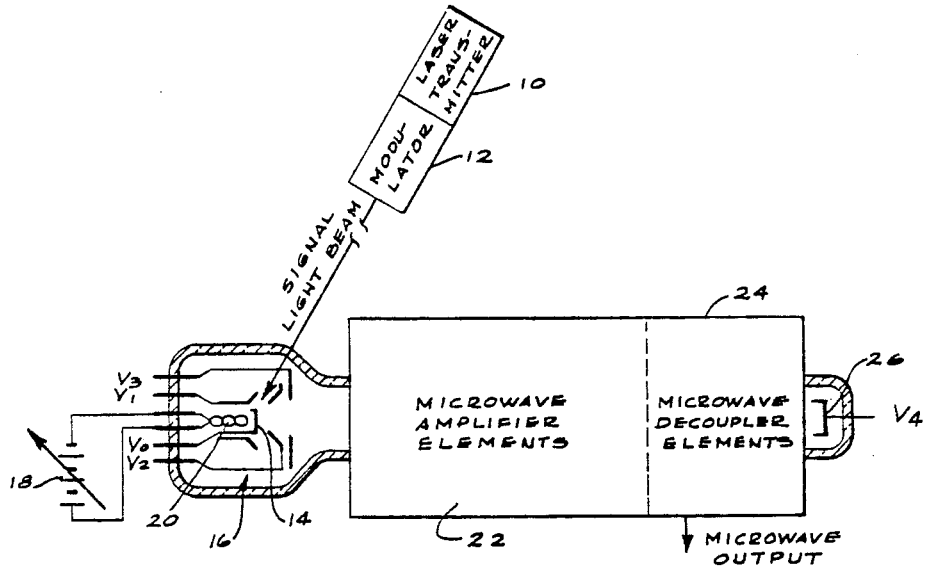
FIG. 1 is an overall diagrammatic representation of a modulated coherent light signal communication system constructed in accordance with the principles of the present invention.

In FIG. 1 a broadband photosensitive system for detecting microwave amplitude modulated light is shown schematically. A laser transmitter 10 such as, for example, a solid state ruby rod type provides a coherent optical output which is modulated by a modulator 12 which may be a solid state Pockels cell as described above. The signal light beam output of the transmitter and modulator is directed upon the photosensitive surface of a photo-emitting cathode 14 of a microwave amplifier tube electron gun 16. Other well known focusing and beam forming electrodes may be provided as shown and supplied with appropriate operating potentials such as $V_1$, $V_2$ and $V_3$, the cathode surface being at potential $v_0$. In addition the electron gun or a portion thereof may be immersed in a longitudinal focusing magnetic field.

An effectively variable source of potential 18 may be coupled as shown to a cathode heater 20 for purposes of supplying a predetermined magnitude of heat to the cathode 14, as for example to supply a quiescent magnitude of electron stream current in order to optimize the interacting capability of the electron stream with microwave amplifier elements 22 which are disposed in electromagnetic energy exchange relationship with the electron stream. It may be noted, however, as discussed in more detail below, that a purely photo-induced current is in some instances totally adequate for optimum amplification. The amplifier elements 22 may be any known appropriate electron beam amplifier structure or combinations thereof such as beam parametric amplifier pumps, conventional helical slow wave structure elements, velocity jump electrodes or the like. Similarly, appropriate microwave decoupler elements 24 are provided at the output end of the microwave amplifier tube for coupling the microwave output signal from the electron stream or the microwave amplifier elements 22. The electron stream may then be collected by collector 26 at a potential $V_4$ and returned to the system power supply.

As indicated above the microwave elements 22 may be a helix or similar slow wave traveling wave tube circuit. Such devices of course offer the advantages of very large traveling wave tube bandwidths coupled with the built-in amplification in the microwave tube section; and in addition they are feasible and practical to extremely high microwave frequencies.

Figure 2:
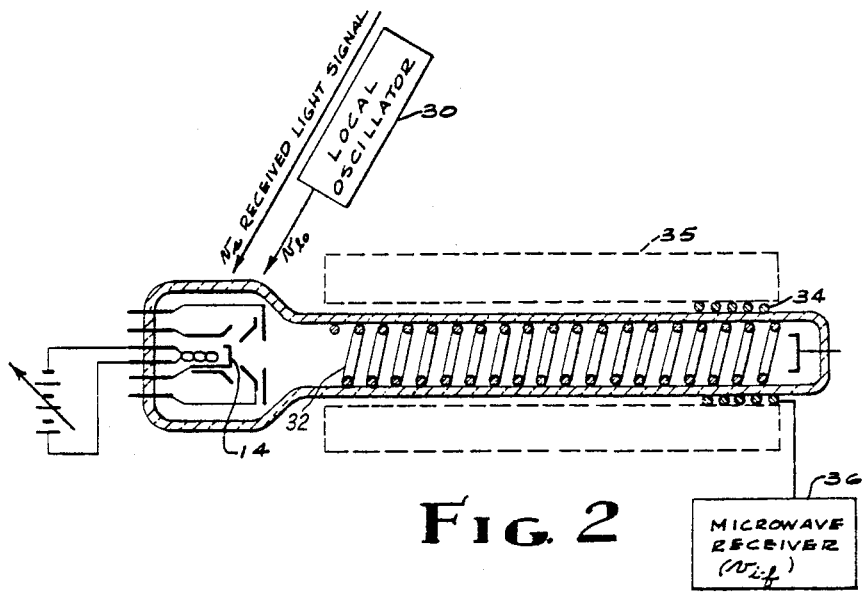
FIG. 2 is a more detailed schematic view of a microwave phototube example of the present invention utilizing a traveling wave tube.

Referring to FIG. 2 an optical heterodyne example of the invention is illustrated. In this example both the received light signal and that from the local oscillator 30, which may be a laser, are impressed upon the photosensitive cathode 14. The two signals at optical frequencies, $v_s$ and $v_{lo}$, respectively, are simultaneously incident upon the photocathode 14. The resulting photo omission process is an optical square law effect and the photocurrent will contain an intermediate frequency beat component at the difference frequency $v_s - v_{lo}$.

It is important that the wavefronts of the two signals be mutually parallel everywhere across the cathode surface in order to avoid cancellation and other deleterious combining effects. They need not however be planar wavefronts nor need they be parallel to the cathode surface.

The initial photocurrent containing the modulation of the received light signal excites the well known space charge waves on the electron stream; and the interaction between the stream, which may, in some cases, be enhanced by additional thermal current, and the slow wave structure helix 32 causes amplification of the microwave intermediate frequency wave. At the output end of the helix 32 a decoupling means which may be a contrawound coupling helix 34 may be disposed in energy exchange relationship with the stream and the helix 32. Conventional stream focusing means 35 is provided as shown and may be permanent magnet, solenoid, or electrostatic in character. A microwave receiver 36 may be coupled to the coupling helix 34 for purposes of further amplifying the demodulated received light signal. Thus the system illustrated in an optical heterodyne receiver with the photocathode functioning as the mixer and the remainder of the tube as the I.-F. section. The I.-F. bandwidth is the microwave pass band of the microwave tube section.

The sensitivity and selectivity of the receiver system illustrated in FIG. 2 are advantageously favorable. In particular the optical heterodyne receiver responds only to the input frequencies which are within the frequency distance of the I.-F. bandwidth away from the local oscillator. Thus it provides I.-F. filtering, rejecting all background noise and other optical frequencies. This is particularly advantageous in the optical case because it is difficult to obtain adequate pre-selector filtering by optical filters in front of the receiver in the path of the received light signal.

The strong light beam from the local oscillator 30 produces a strong direct current in the microwave phototube which is desirable in order to obtain large traveling wave tube interaction and gain in the microwave tube section. In addition, as the local oscillator strength is varied the shot noise and the conversion gain of the photo mixing process vary at the same rate, and the sensitivity is independent of a local oscillator strength.

In order for the local oscillator and signal wave light beams to photo mix properly they must appear at the cathode with the same angle of incidence. Referring to FIG. 3 the effect of this requirment can be seen to be advantageous in providing directionality or "antenna gain" to the optical receiver. In the figure an optical receiver-modulator phototube 40 is illustrated having a charged particle photoemitter 42 physically associated with it. A laser local oscillator 44 and a partial mirror 46 may be arranged with respect to the photosensitive surface of the photoemitter 42 so that a portion of the local oscillator light is impressed thereon. There is then a direction defined for the receiver along which the signal light must arrive if it is to be detected. The signal light must arrive within the very narrow "main beam lobe" shown in the figure, this lobe being essentially the defraction pattern of the phototube cathode in that direction with the width "a" being equal approximately to the wavelength of the signal wave divided by the cathode width. When desired, the receiving lobe may be broadened by optical methods not illustrated, but such broadening is at the cost of decreased antenna gain within the broadened lobe.

Referring to FIG. 4 an example of the invention is illustrated in which the signal wave of frequency $\nu_s$ and a local oscillator wave of frequency $\nu_{lo}$ are directed upon a photo mixing cathode 50. The resultant photocurrent carries a space charge wave corresponding to the beat frequency $\nu_{if}$ which is amplified by a beam parametric amplifier pump 52 disposed contiguously to the electron stream downstream from the cathode 50. The waves thusly amplified may be removed from the beam by a beam coupler 54 which may be for example an output helix of a Cuccia type coupler. The output signal from the beam coupler 54 is typically a microwave signal at frequency $\nu_{if}$ containing the modulation on the original signal wave $\nu_s$. Depending upon the type of beam parametric amplifier pump being utilized a longitudinal magnetic field H may be provided by a magnet means not shown, to provide a constraining effect for the electron stream or to provide an environment for the support of cyclotron waves associated with the stream particles.

Referring to FIG. 5 an example of the invention is illustrated in which, after the photo mixing takes place on a photocathode 50 as in the previous example of FIG. 4, the microwave modulation on the electron stream may be pre-amplified by a velocity jump mechanism provided by a series of electrodes disposed contiguously to the electron stream in two sets. A first set 56 is maintained at a first velocity jump potential $V_1$ and a second set 58 is maintained at a second velocity jump potential $V_2$, the potentials $V_1$ and $V_2$ being chosen to maximize the amplification. It may be noted that the velocity jump principle indicated by the figure is the same phenomenon typically used for attenuating or de-amplifying stream noise for low noise electron devices. In this example, however, the potentials are reversed to achieve precisely the opposite effect. The stream thusly pre-amplified may then be directed through a beam amplifier 60 for further amplification of the electron stream waves and to provide an output signal $\nu_{if}$.

Referring to FIG. 6 an alternative arrangement of the optics for impressing either the modulated light wave, in the video mode, or the two coincident waves, "signal" and "local oscillatory," in the heterodyne mode onto the detector or mixer element of the system. In this example, a front-surface mirror 62 is disposed within the envelope of a microwave phototube 64. The mirror 62 is oriented at an angle such that an axially directed light beam 66 (or beams, in the heterodyne mode) is reflected onto the photoemissive surface 68 of a photo electron gun 70. This "end-fire" arrangement provides a number of advantages including ease of alignment in a desired "antenna" direction and a simplified refraction and reflection problem for the light entrant through the glass envelope. Additional optics arrangements for illuminating the detector cathode will become apparent to one skilled in the art.

The various arrangements and examples of the invention as indicated above may be constructed with either purely photoemissive cathodes, or with photocathodes which serve simultaneously as thermionically emissive cathodes. A traveling wave tube, presently preferred embodiment, utilizes a pure photocathode. Efficient and adequate beam-helix coupling is obtained with beam current which is much less even in magnitude than the Kompfner-dip current. A significant difference between the present microwave phototube and a conventional traveling-wave tube amplifier is that the beam in the phototube is initially current-modulated, i.e., at the cathode; and a current-modulated electron beam will produce significant beam-circuit interaction even at low currents. The distinction is made clear by an examination of the coupled-mode equations for traveling wave interactions in the cathode current-modulated case versus a conventional circuit induced modulation case.

There have thus been disclosed a number of examples of light signal receiver systems including microwave phototubes which exhibit the advantages and achieve the objects set forth earlier above and which in addition furnish an extremely valuable tool for the study and investigation and analysis of the operation of experimental lasers which are being developed with great frequency in research laboratories throughout the world. For example a ruby laser has been found to provide not, as originally supposed, a single monochromatic light output but rather a series of discrete, quasimonochromatic, more or less independent outputs at slightly different optical frequencies.

These different outputs represent laser oscillation in different axial modes of the laser rod, that is modes in which the oscillation standing wave pattern along the laser rod changes from $n$ to $n+1$ half wavelengths where $n$ is an integer. The frequency interval between adjacent modes depends on rod length and is typically a micro-wave frequency. For example for two-inch long laser rod, the interval between the modes is 1.5 kilomegacycles.

When these multiple optical frequencies strike a photosensitive cathode such as the traveling wave tube cathode 14 in the system illustrated in FIG. 2, photo mixing occurs and the phototube gives microwave outputs at the harmonically related frequencies corresponding to adjacent laser modes. The signal laser thereby provides both the local oscillator and the signal light beams for investigating in great depth its own optical laser operation. For example the exact frequency spacing of the microwave beats is observed to vary from case to case revealing information about the mode structure of the laser.

What is claimed is:

1. Apparatus of the type described comprising a photosensitive source of a stream of charged particles, microwave amplifier element means disposed in electromagnetic interaction relationship with the charged particles of said stream, and means for directing a modulated optical carrier wave signal upon the surface of said photosensitive source of charged particles.

2. A light signal detector comprising: a photosensitive source for providing a stream of charged particles along a predetermined path; electromagnetic interaction elements disposed contiguously about said predetermined path; coupling means for removing amplified signals from said interaction elements; and means for directing modulated light signal waves upon said photosensitive source.

3. A microwave phototube comprising: a charged particle amplifier including a photoemissive source of a stream of charged particles; microwave amplifier element means disposed in electromagnetic interaction relationship with the charged particles of said stream; and means for impressing a modulated optical carrier wave signal upon the surface of said photoemissive source of charged particles.

4. A light signal detector comprising a charged particle amplifier system including: a photoemissive source for providing a stream of charged particles along a predetermined path; broad band microwave amplifier interaction elements disposed contiguously about said predetermined path; coupling means for removing amplified signals from said microwave interaction elements; and means for impressing modulated light signal waves upon said photosensitive source whereby said stream comprises photocurrent which is modulated in accordance with the modulation of said light signal waves.

5. A phototube system for detecting light wave signals and for amplifying the detected modulation, the phototube system comprising: an amplifier tube including amplifier elements and electron gun means for providing an electron stream directed contiguously to said amplifier elements and in electrogmagnetic interaction relationship therewith, said electron gun means comprising a photosensitive cathode for emitting an electron photo current responsive to light signals applied thereto; and means for impressing said light wave signals upon said photosensitive cathode.

6. A microwave phototube system for detecting and demodulating light wave signals as from a laser transmitter and for amplifying the detected modulation, the phototube system comprising: a microwave amplifier tube including microwave amplifier elements and electron gun means for providing an electron stream directed contiguously to said microwave elements and in electromagnetic interaction relationship therewith, said electron gun means comprising a photosensitive cathode for emitting an electron photo current responsive to light signals applied thereto; and means for impressing said light wave signals upon said photosensitive cathode.

7. A light signal demodulator and amplifier comprising: a microwave interaction amplifier structure; an electron gun including a photosensitive cathode and being adapted to direct a stream of photocurrent electrons contiguously to said microwave structure in electromagnetic interaction relationship therewith; and means for impressing a light beam carrier wave upon the photo emissive surface of said cathode.

8. A traveling wave tube light beam demodulator and amplifier comprising: a traveling wave interaction amplifier structure; an electron gun including a photosensitive cathode and being of the character for directing a stream of photocurrent electrons contiguously to said traveling wave amplifier structure in electromagnetic growing wave interaction relationship therewith; and means for impressing a light beam carrier wave upon the photo emissive surface of said cathode whereby the character of said photocurrent includes the intelligence carried by said light beam carrier wave.

9. A heterodyne optical receiver for demodulating and amplifying a coherent light signal as from a laser transmitter, said receiver comprising: a microwave amplifier tube including microwave amplifier elements and electron gun means for providing an electron stream directed along a predetermined path contiguous to said microwave elements in electromagnetic interaction relationship therewith; said electron gun means comprising a photosensitive cathode for emitting a varying electron photocurrent responsive to the modulation of said coherent light signal; means for impressing said light signal upon said photosensitive cathode at a predetermined angle of incidence; an optical local oscillator for generating a local coherent light signal; and means for impressing said local coherent light signal upon said photosensitive cathode at said predetermined angle of incidence.

10. A heterodyne optical receiver comprising: a microwave amplifier tube including microwave amplifier means for amplifying microwave electron stream waves of frequency $v_{i-f}$ and an electron gun having a square law photosensitive mixer cathode for directing an electron stream contiguously to said amplifier means, said stream being at least partially constituted of photocurrent; means for impressing a coherent light signal of frequency of $v_s$ upon said mixer cathode at a predetermined angle of incidence; a local oscillator for generating a coherent mixing light beam of frequency $v_{lo}$; and means for impressing said mixing light beam upon said mixer cathode; the relationship between $v_{lo}$ and $v_s$ being such that the absolute value of their difference equals $v_{i-f}$.

11. The invention according to claim 10 in which said microwave amplifier means includes a traveling wave circuit.

12. The invention according to claim 10 in which the microwave amplifier means includes an electron stream wave parametric amplifier pump.

13. The invention according to claim 10 which further includes a velocity jump pre-amplifier interposed between said photosensitive mixer cathode and said amplifier means for amplifying the microwave current modulation on said electron stream.

14. A traveling wave tube heterodyne optical receiver system comprising a traveling wave tube amplifier including: an electron gun for providing an electron stream directed along a predetermined path; a helical slow wave structure disposed contiguously to said path in electromagnetic energy interchange relationship with said electron stream, said electron gun including a photo emissive cathode for emitting a varying electron current responsive to the magnitude of light energy incident thereupon; an optical local oscillator; means for directing the output of said local oscillator upon the photo emissive surface of said cathode at a predetermined angle of incidence; and means for impressing upon said photosensitive surface of said cathode a coherent received light signal at said predetermined angle of incidence.

15. A traveling wave tube heterodyne optical receiver comprising a traveling wave tube amplifier including: an electron gun for providing an electron stream directed along a predetermined path; a helical slow wave structure disposed contiguously to said path in electromagnetic energy interchange relationship therewith and having a signal output end; a microwave receiver coupled to said signal output end of said slow wave structure, said electron gun including a photo and thermionic emissive cathode for emitting a varying electron current responsive to the magnitude of light energy incident thereupon and to the temperature to which it is heated; electrical heater means thermally coupled to said cathode; an optical local oscillator; means for directing the output of said local oscillator upon the photo emissive surface of said cathode at a predetermined angle of incidence; and means for impressing upon said photosensitive surface of said cathode a coherent received light signal at said predetermined angle of incidence.

References Cited by the Examiner

UNITED STATES PATENTS

| | | | |
|---|---|---|---|
| 2,004,177 | 6/1935 | Schriever | 315—150 |
| 2,206,072 | 7/1940 | Barthelemy | 325—442 |
| 2,265,784 | 12/1941 | Von Baeyer | 250—199 |
| 2,406,635 | 8/1946 | Ramo | 325—442 |
| 2,688,107 | 8/1954 | Salisbury | 330—59 |
| 2,814,779 | 11/1957 | Mendel | 329—156 |
| 3,068,422 | 12/1962 | Grabowski | 330—4.6 |
| 3,114,268 | 12/1963 | Boldridge | 88—1 |
| 3,154,748 | 10/1964 | Javan et al. | 250—199 X |

FOREIGN PATENTS 197,268 12/1923 Great Britain.

OTHER REFERENCES

Haeff: Proc. I.R.E., vol. 37, No. 1, 1949, pp. 4–10.

Forrester et al.: Physical Review, vol. 99, No. 6, Sept. 15, 1955, pp. 1691–1700.

McMurtry et al.: Applied Optics, vol. 1, January 1962, pp. 51–54.

DAVID G. REDINBAUGH, *Primary Examiner.*